United States Patent
Sato et al.

(10) Patent No.: US 7,712,450 B2
(45) Date of Patent: May 11, 2010

(54) IGNITION TIMING CONTROL APPARATUS AND IGNITION TIMING CONTROL METHOD FOR INTERNAL COMBUSTION ENGINE

(75) Inventors: Kenichiro Sato, Nagoya (JP); Tomohiro Fujita, Toyota (JP); Akito Onishi, Nagoya (JP); Mitsuhiro Nada, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 49 days.

(21) Appl. No.: 12/128,964

(22) Filed: May 29, 2008

(65) Prior Publication Data

US 2009/0031989 A1    Feb. 5, 2009

(30) Foreign Application Priority Data

May 29, 2007   (JP)   .............................. 2007-141768

(51) Int. Cl.
*F02P 5/00*   (2006.01)
*F02P 1/00*   (2006.01)

(52) U.S. Cl. ........................ 123/406.11; 123/406.21; 123/406.22; 123/406.41

(58) Field of Classification Search ................ 701/103, 701/104, 105; 123/406.11, 406.16, 406.17, 123/406.21, 406.22, 406.26, 406.29, 406.34, 123/406.41, 406.42, 406.43
See application file for complete search history.

(56) References Cited

U.S. PATENT DOCUMENTS

| 4,633,835 | A  | * | 1/1987 | Akasu ................... | 123/406.16 |
| 7,472,687 | B2 | * | 1/2009 | Zhu et al. .............. | 123/406.34 |
| 2005/0126537 | A1 | * | 6/2005 | Daniels et al. ......... | 123/406.14 |

FOREIGN PATENT DOCUMENTS

| JP | 7-77146 A | 3/1995 |
| JP | 9-170540 A | 6/1997 |
| JP | 10-148171 A | 6/1998 |
| JP | 2002-31024 A | 1/2002 |
| JP | 2005-147112 A | 6/2005 |

* cited by examiner

*Primary Examiner*—John T Kwon
(74) *Attorney, Agent, or Firm*—Sughrue Mion, PLLC

(57) ABSTRACT

In an ignition timing control apparatus for an engine, a KCS learning value learned when the engine is in a given operating state is used in an ignition timing control executed when the engine is in the other operating state. An estimated knocking occurrence ignition timing is set based on a most retarded ignition timing using the KCS learning value. A final ignition timing is set by changing a KCS feedback correction value based on whether knocking occurs when ignition is performed at the estimated knocking occurrence ignition timing. When a point indicating the engine operating state moves into a region where it is difficult to set the estimated knocking occurrence ignition timing, the KCS feedback correction value is changed to retard the final ignition timing, and the final ignition timing is set using the KCS learning value and the changed KCS feedback correction value.

9 Claims, 11 Drawing Sheets

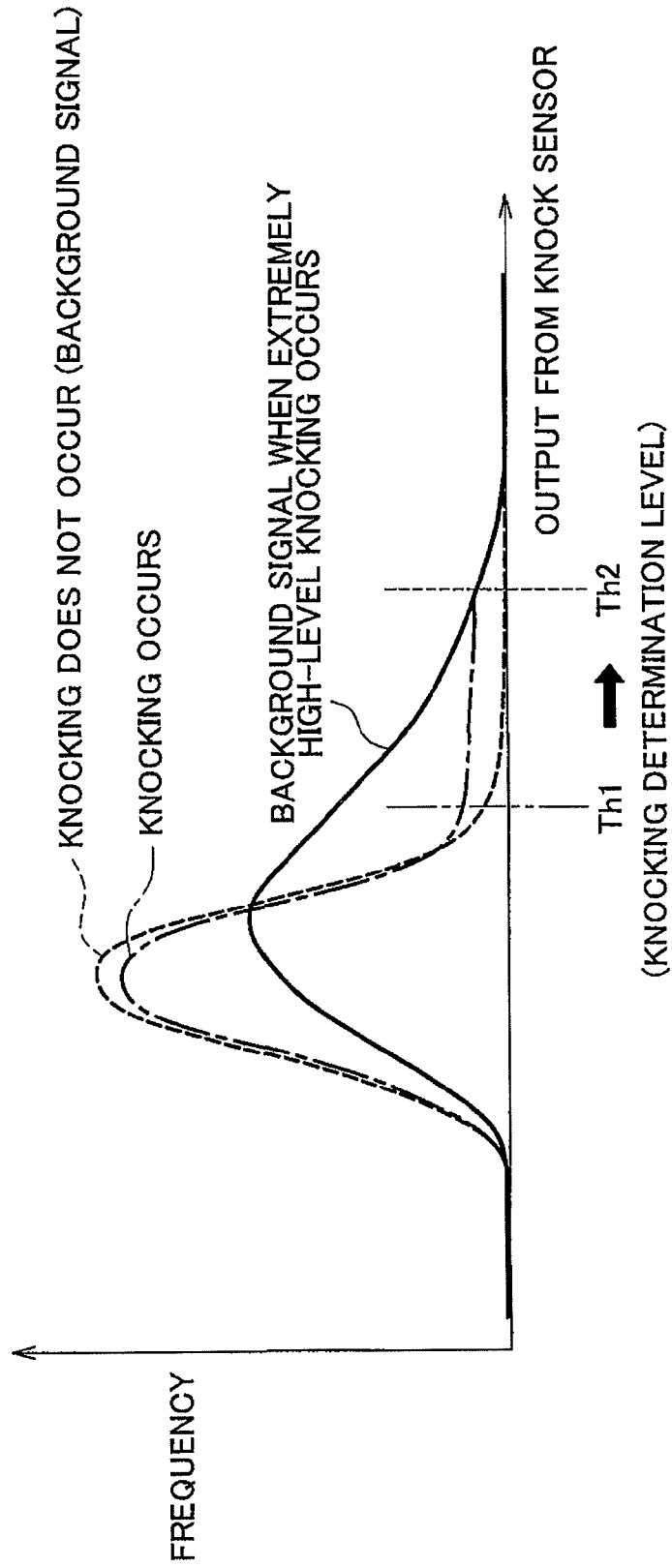

IGNITION TIMING CONTROL APPARATUS AND IGNITION TIMING CONTROL METHOD FOR INTERNAL COMBUSTION ENGINE

INCORPORATION BY REFERENCE

The disclosure of Japanese Patent Application No. 2007-141768 filed on May 29, 2007 including the specification, drawings and abstract is incorporated herein by reference in its entirety.

BACKGROUND OF THE INVENTION

1. Field of the Invention

The invention relates to an ignition timing control apparatus and an ignition timing control method that control an ignition timing of an ignition plug according to an operating state of an internal combustion engine.

2. Description of the Related Art

In an internal combustion engine (hereinafter, may be simply referred to as "engine"), an ignition timing control is executed to generate an output most efficiently using combustion, and to provide good exhaust gas purification performance and good fuel efficiency. It is known to be preferable to make a pressure in a combustion chamber reach a peak slightly after a compression top dead center, to generate the output most efficiently using energy generated by the combustion. Therefore, an ignition timing is set so that the pressure reaches the peak slightly after the compression top dead center. However, when the ignition timing is too early (i.e., when the ignition timing is too advanced), knocking occurs.

An ignition timing control apparatus, which executes a knock control system (hereinafter, referred to as "KCS") control, is available. In the KCS control, it is determined whether knocking occurs using a knock sensor, and a feedback correction process (feedback control) is executed to adjust the ignition timing, according to the determination as to whether knocking occurs. Also, to execute the feedback correction process in quick response to the determination, a learning control is executed to store and retain, as a learning value, the degree of change in the ignition timing caused by the feedback correction process (for example, refer to Japanese Patent Application Publication No. 2002-031024 (JP-A-2002-031024) and Japanese Patent Application Publication No. 2005-147112 (JP-A-2005-147112)). The ignition timing control apparatus calculates a final ignition timing in the engine, for example, based on the equation (3) and the equation (4) described later (refer to, for example, FIG. 4).

In the ignition timing control apparatus described in Japanese Patent Application Publication No. 2002-031024 (JP-A-2002-031024), the learning value (KCS teaming value), which is learned by the earning control when the engine E is in a given operating state, is used in the ignition timing control executed when the engine E is in the other operating state. For example, a line indicating the ignition timing (estimated knocking occurrence ignition timing) is set to be parallel to a line for setting a most retarded ignition timing, and ignition is performed at the ignition timing on the line indicating the estimated knocking occurrence ignition timing. The estimated knocking occurrence ignition timing is the estimated most advanced ignition timing at which occurrence of knocking is suppressed. In this case, the line indicating the estimated knocking occurrence ignition timing is parallel to, and advanced with respect to the line indicating the most retarded ignition timing by the learning value that is used. Then, the final ignition timing is set based on the ignition timing feedback-corrected according to whether knocking occurs (refer to, for example, FIG. 4). As a result, the ignition timing when the engine is in the operating state is learned, and the learning value is updated. The learning value, which is learned in the above-described manner, is further used in the ignition timing control executed when the engine is in the other operating state.

In the above-described ignition timing control apparatus, to suppress occurrence of knocking, it is important to accurately set the estimated knocking occurrence ignition timing based on the most retarded ignition timing using the learning value learned by the learning control. That is, if the estimated knocking occurrence ignition timing cannot be accurately set, much time is required to stop knocking. Therefore, knocking may continue to occur a plurality of times. Also, knocking noise may be transmitted to a vehicle cabin, and an occupant may feel discomfort. Further the engine may be adversely influenced.

However, it is difficult to accurately set the estimated knocking occurrence ignition timing in individual engines, because there are various driving environments, and there are variations among individual engines. In addition, it may be difficult to accurately set the estimated knocking occurrence ignition timing, depending on an operating condition of the engine.

In such a case, if the learning value learned by the above-described learning control is used without correction, the estimated knocking occurrence ignition timing may greatly vary. Accordingly, when the engine is operated in a certain operating condition, it is not appropriate to use the learning value learned by the above-described learning control without correction.

For example, when a driver operates an accelerator pedal, and therefore, a point indicating the operating state of the engine moves into a low load region, it is not appropriate to use the learning value without correction. When the point indicating the operating state of the engine is in the low load region, the ignition timing is sensitive to the driving environment, the variations among the individual engines, and the like, and therefore the ignition timing is likely to fluctuate. Thus, it is difficult to accurately set the estimated knocking occurrence ignition timing.

Also, for example, when deposits are formed in the engine due to unburned fuel, blow-by gas, lubricant oil, and the like, and the degree of formation of deposits is high, it is not appropriate, to use the learning value without correction. As the engine is used, deposits are gradually formed in an intake port, an intake valve, a piston, and the like. When the degree of formation of deposits is increased, the substantive volume of a combustion chamber is decreased, and therefore, a cylinder pressure at the time of combustion is increased. As a result, knocking is likely to occur. In the publication No. 2005-147112, it is described that a ratio learning process is executed taking into account the influence of formation of deposits in the ignition timing control. However, as the load of the engine becomes lower, the influence of deposits is more notable. Therefore, when the point indicating the operating state of the engine is in the low load region, even if the ratio learning process is executed, it is difficult to accurately set the estimated knocking occurrence ignition timing.

Also, as described above, when the estimated knocking occurrence ignition timing cannot be accurately set a determination as to whether knocking occurs (hereinafter, referred to as "knocking determination") may be adversely influenced. That is, when knocking gradually occurs, it can be accurately determined that knocking occurs. However, because the estimated knocking occurrence ignition timing cannot be accurately set, if the operating state of the engine suddenly changes, and unexpected knocking at a high level (extremely high-level knocking) occurs, it may not be possible to accurately determine that knocking occurs.

The knocking determination may be performed by comparing a peak hold value of an output from a knock sensor (shown by the chain line in FIG. 11) with a background signal and that is assumed to be a normally-distributed signal (shown by the dashed line in FIG. 11). In this case, when the level of the output from the knock sensor is equal to or above a knocking determination level (Th1 it FIG. 11), and a difference between the output from the knock sensor and the background signal is equal to or above a predetermined determination value, it is determined that knocking occurs. However, in this case, when the level of the background signal increases, for example, due to occurrence of unexpected extremely high-level knocking (as shown by the solid line in FIG. 11), the knocking determination level also increases to a higher level (Th2 in FIG. 11). When the knocking determination level increases, it may be determined that knocking does not occur even if knocking actually occurs. As a result, it is not possible to appropriately retard the ignition timing, and knocking may continue to occur.

SUMMARY OF THE INVENTION

The invention provides an ignition timing control apparatus and an ignition timing control method for an internal combustion engine, which suppress frequency of occurrence of knocking when a point indicating an operating state of the internal combustion engine moves into a region where it is difficult to accurately set an estimated knocking occurrence ignition timing based on a most retarded ignition timing using a learning value learned by a learning control.

A first aspect of the invention relates to an ignition timing control apparatus for an internal combustion engine. In the ignition timing control apparatus, a learning value of an ignition timing, which is learned by a learning control when the internal combustion engine is in a given operating state, is used in an ignition timing control executed when the internal combustion engine is in another operating state. An estimated knocking occurrence ignition timing is set based on a most retarded ignition timing using the learning value. The most retarded ignition timing is set based on an operating state of the internal combustion engine. A final ignition timing is set by executing a feedback correction process in which a correction amount is changed based on whether knocking occurs when ignition is performed at the estimated knocking occurrence ignition timing.

In the first aspect, when a point indicating the internal combustion engine moves into a region where it is difficult to set the estimate knocking occurrence ignition timing, the correction amount is changed by a predetermined amount to retard the final ignition timing, and the final ignition timing is set using the changed correction amount and the learning value. In this case, the predetermined amount, by which the correction amount is changed to retard the final ignition timing when the point indicating the operating state of the internal combustion engine moves into the region where it is difficult to set the estimated knocking occurrence ignition timing, is set to be larger than an amount by which the correction amount is changed to retard the final ignition timing when knocking occurs.

According to the first aspect, when the point indicating the operating state of the engine moves into the region where it is difficult to accurately set the estimated knocking occurrence ignition timing, the correction amount, which is changed based on whether knocking occurs in the feedback correction process, is changed by the predetermined amount to retard the ignition timing (final ignition timing), and the changed correction amount is used to set the ignition timing (final ignition timing). That is, when the point indicating the operating state of the engine moves into the region, not only the learning value learned by the learning control, but also the correction amount, which is changed by the predetermined amount, is used to set the final ignition timing. Accordingly, the final ignition timing is retarded by the amount by which the correction amount is changed. Thus, when knocking occurs, it is possible to quickly retard the final ignition timing by the feedback correction process to stop knocking. Accordingly, the time required to stop knocking is shod, and the frequency of occurrence of knocking is suppressed. When the correction amount, which is changed to retard the final ignition timing, is used to set the first ignition timing, first, the estimated knocking occurrence ignition timing may be set using the changed correction amount and the learning value, and then, the final ignition timing may be set using the estimated knocking occurrence ignition timing.

Also, when the point indicating the operating state of the engine moves into the low-load region where it is difficult to accurately set the estimated knocking occurrence ignition timing, it is possible to suppress occurrence of unexpected knocking at a high level (i.e., extremely high-level knocking). Thus, it is possible to suppress an adverse influence on the knocking determination. For example, it is possible to reduce the possibility that when knocking actually occurs, it is erroneously determined that knocking does not occur. Because the knocking determination is accurately performed in this manner, it is possible to appropriately retard the final ignition timing by the feedback correction, and to reliably stop knocking.

Two examples of the region where it is difficult to set the estimated knocking occurrence ignition timing are as follows.

One of the examples of the region is a low load region where an engine load is low, for the following reason. When the point indicating the operating state of the engine is in the low load region, the ignition timing is sensitive to the driving environment, the variations among the individual engines, and the like, and therefore, the ignition timing is likely to fluctuate. Thus, it is difficult to accurately set the estimated knocking occurrence ignition timing.

The other of the examples of the region is an overlapping region where the low load region overlaps a region where a difference in the most retarded ignition timing is equal to or above a predetermined value. The difference in the most retarded ignition timing is a difference between the most retarded ignition timing when no deposit is formed in the internal combustion engine and the most retarded ignition timing when an amount of a deposit formed in the internal combustion engine is a maximum possible amount. This is because when the degree of formation of deposits is increased, the substantive volume of a combustion chamber is decreased, and therefore a cylinder pressure at the time of combustion is increased. As a result, knocking is likely to occur. As the load of the engine becomes lower, the influence of deposits is more notable. Therefore, when the point indicating the operating state of the engine is in the low load region, it is difficult to accurately set the estimated knocking occurrence ignition timing.

A second aspect of the invention relates to an ignition timing control method for an internal combustion engine. In the ignition timing control method, an estimated knocking occurrence ignition timing is set based on a most retarded ignition timing using a learning value of an ignition timing learned by a learning control when the internal combustion engine is in a given operating state. The most retarded ignition timing is set based on an operating state of the internal combustion engine. A final ignition timing is set by executing a feedback correction process in which a correction amount is changed based on whether knocking occurs when ignition is performed at the estimated knocking occurrence ignition timing. When it is determined that a point indicating the operating state of the internal combustion engine moves into a region where it is difficult to set the estimated knocking occurrence ignition timing, the correction amount is changed by a predetermined amount to retard the final ignition timing, and the final ignition timing is set using the learning value and the changed correction amount.

According to the above-described aspects, when the point indicating the operating state of the engine moves into the region where it is difficult to accurately set the estimated knocking occurrence ignition timing based on the most retarded ignition timing using the learning value learned by the learning control, the time required to stop knocking is short, and it is possible to suppress the frequency of occurrence of knocking.

BRIEF DESCRIPTION OF THE DRAWINGS

The foregoing and further objects, features and advantages of the invention will become apparent from the following description of example embodiments with reference to the accompanying drawings wherein like numerals are used to to represent like elements and wherein:

FIG. 11 is a diagram illustrating an adverse influence on a knocking determination in related art.

DETAILED DESCRIPTION OF EMBODIMENTS

An embodiment of the invention will be described with reference to the drawings. Hereinafter, a case where an ignition timing control apparatus according to the invention is applied to a V-6 engine for a vehicle will be described. The invention need not necessarily be applied to the V-6 engine for a vehicle. The invention may be applied to various engines.

Figure 1:
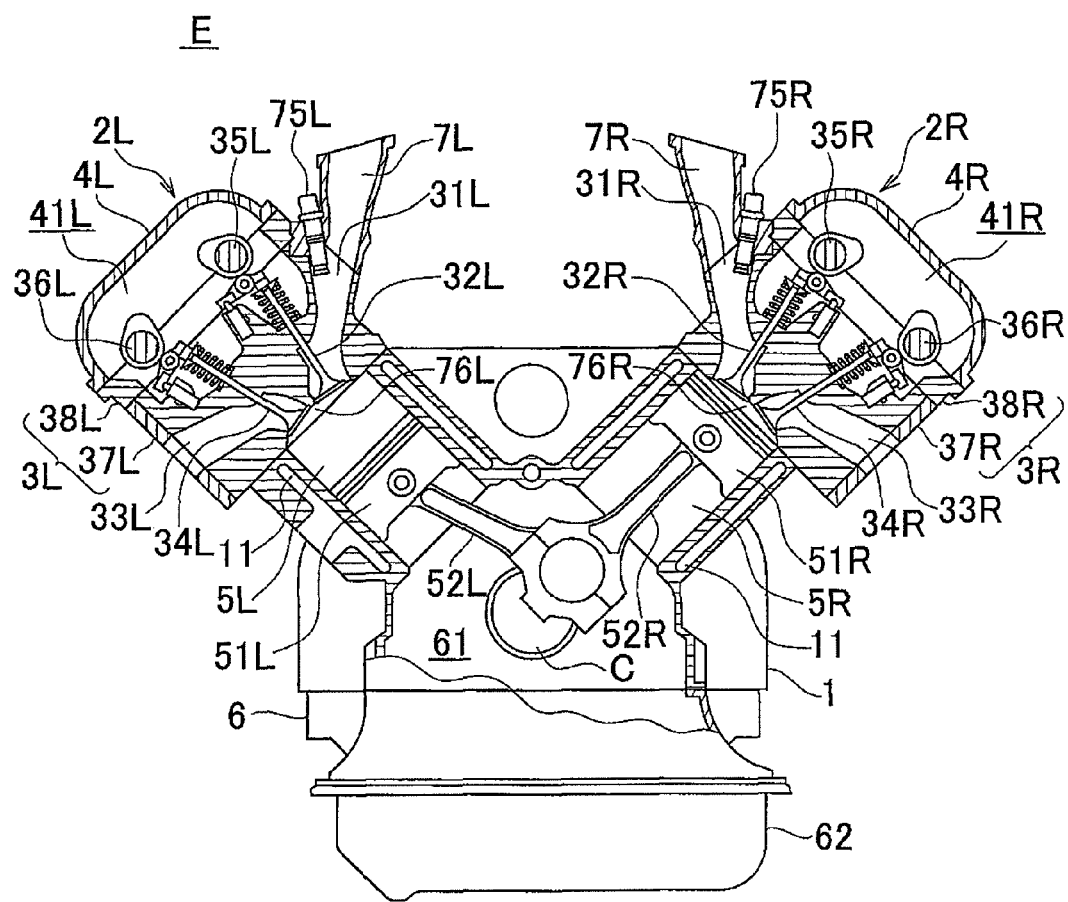
FIG. 1 is a sectional view schematically showing an inside of a V-engine according to an embodiment, taken along a plane perpendicular to the axis of a crankshaft.
Figure 2:
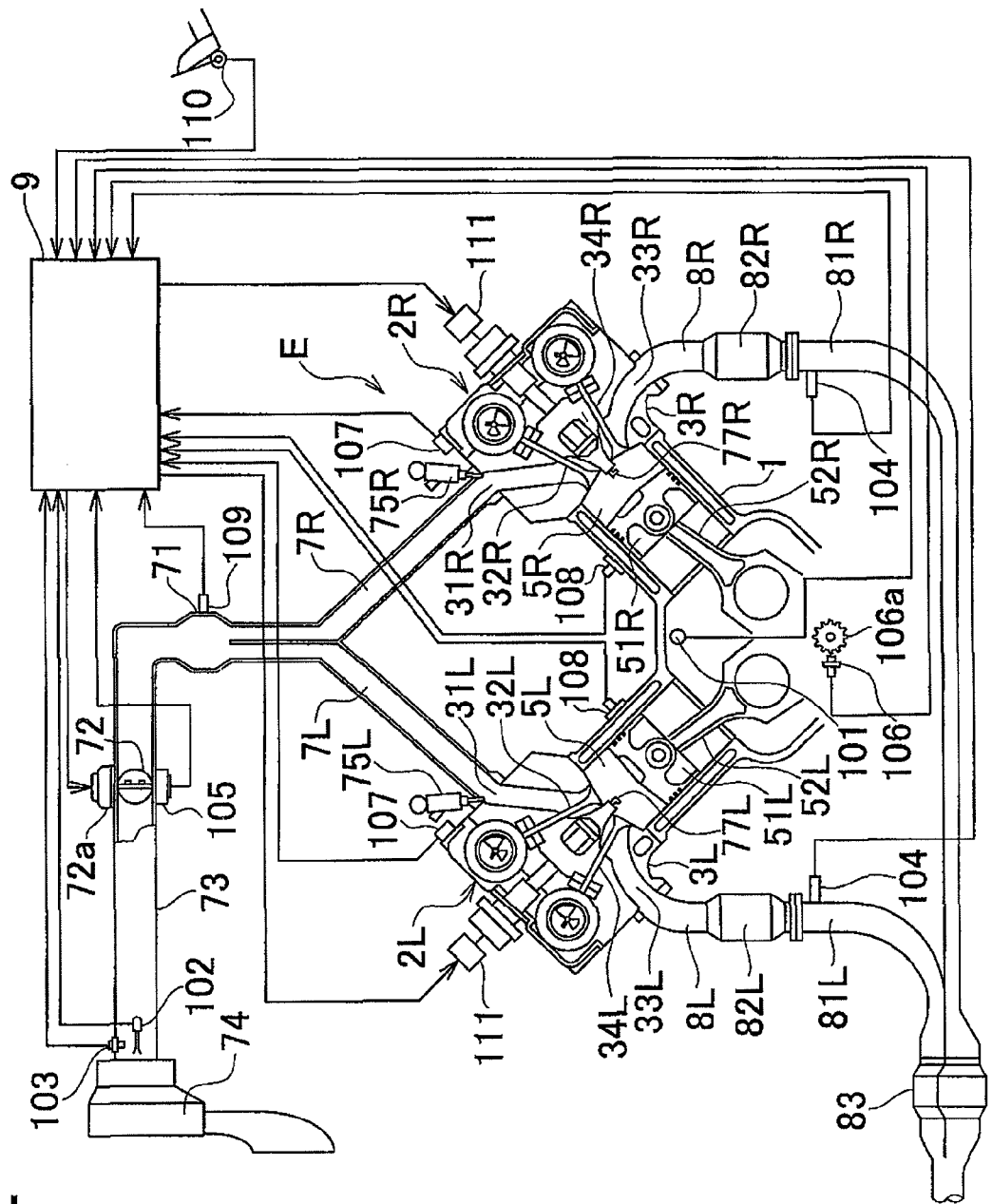
FIG. 2 is a system configuration diagram schematically showing the engine, intake/exhaust systems, and a control system.

[Entire configuration of an engine] FIG. 1 is a sectional view schematically showing an inside of a V-engine E according to the embodiment, taken along a plane perpendicular to the axis of a crankshaft C. FIG. 2 is a system configuration diagram schematically showing the V-engine E, intake/exhaust systems, and a control system.

The V-engine E (hereinafter, simply referred to as "engine E") shown in FIG. 1 and FIG. 2 includes a pair of banks 2R and 2L disposed on an upper portion of a cylinder block 1 to protrude in a V-shape. The bank 2R includes a cylinder head 3R and a head cover 4R. The bank 2L includes a cylinder head 3L and a head cover 4L. The cylinder heads 3R and 3L are disposed on an upper end portion of the cylinder block 1. The head covers 4R and 4L are fitted to upper ends of the cylinder heads 3R and 3L, respectively. The cylinder block 1 is provided with a plurality of cylinders including cylinders 5R and 5L (for example, each of the banks 2R and 2L is provided with three cylinders). A predetermined angle (for example, 90°) is formed between the right and left cylinders. A piston is housed in each cylinder to reciprocate in the cylinder. For example, pistons 51R and 51L are housed in the cylinders 5R and 5L, respectively. Each piston is connected to the crankshaft C via a connecting rod to transmit power. For example, pistons 51R and 51L are connected to the crankshaft C via connecting rods 52R and 52L, respectively. Further, a crankcase 6 is fitted to a lower portion of the cylinder block 1. A crank chamber 61 is formed by a space that extends from the lower portion inside the cylinder block 1 to an inside of the crankcase 6. An oil pan 62, which functions as an oil pool portion, is disposed under a lower portion of the crankcase 6.

An intake valve 32R and an exhaust valve 34R are fitted to the cylinder head 3R. An intake valve 32L and an exhaust valve 34L are fitted to the cylinder head 3L. The intake valves 32R and 32L open/close intake ports 31R and 31L, respectively. The exhaust valves 34R and 34L open/close exhaust ports 33R and 33L, respectively. Camshafts 35R and 36R are disposed in a cam chamber 41R formed between the cylinder head 3R and the head cover 4R. Camshafts 35L and 36L are disposed in a cam chamber 41L formed between the cylinder head 3L and the head cover 4L. The valves 32R, 32L, 34R, and 34L are opened/closed by the rotation of the camshafts 35R, 35L, 36R, and 36L, respectively.

Each of the cylinder heads 3R and 3L is formed by sections. More specifically, the cylinder head 3R is formed by a cylinder head body 37R fitted to an upper surface of the cylinder block 1, and a camshaft housing 38R fitted to an upper portion of the cylinder head body 37R. The cylinder head 3L is formed by a cylinder head body 37L fitted to the upper surface of the cylinder block 1, and a camshaft housing 38L fitted to an upper portion of the cylinder bead body 37L.

Intake manifolds 7R and 7L for the banks 2R and 2L are disposed in upper portions of inner sides of the banks 2R and 2L (i.e., sides that form a trough of the banks), respectively. Downstream ends of the intake manifolds 7R and 7L are connected to the intake ports including the intake ports 31R and 31L. The intake manifolds 7R and 7L are connected to an intake pipe 73 that includes a surge tank 71 (refer to FIG. 2) that is shared by the banks 2R and 2L, and a throttle valve 72. An air cleaner 74 is provided upstream of the intake pipe 73. Thus, air introduced into the intake pipe 73 through the air cleaner 74 is introduced into the intake manifolds 7R and 7L through the surge tank 71.

The intake ports 31R and 31L of the cylinder heads 3R and 3L are provided with injectors 75R and 75L respectively. When fuel is injected from the injectors 75R and 75L, the air introduced into the intake manifolds 7R and 7L is mixed with the fuel injected from the injectors 75R and 75L to form an air-fuel mixture. The air-fuel mixture is introduced into combustion chambers 76R and 76L when the intake valves 32R and 32L are opened.

Ignition plugs 77R and 77L are disposed in top portions of the combustion chambers 76R and 76L, respectively. When the ignition plugs 77R and 77L ignite the air-fuel mixture in the combustion chambers 76R and 76L, the combustion pressure of the air-fuel mixture is transmitted to the pistons 51R and 51L to reciprocate the pistons 51R and 51L. The reciprocating movement of the pistons 51R and 51L is transmitted to the crankshaft C via the connecting rods 52R and 52L, and convened to rotational movement. Thus, the engine E generates an output. When power is transmitted from the crankshaft C to the camshafts 35K, 35L, 36R, and 36L by timing chains, the camshafts 35R, 35L, 36R, and 36L are rotated. The valves 32R, 32L, 34R, and 34L are opened/closed by the rotation of the camshafts 35K, 35L, 36R, and 36L.

After the combustion of the air-fuel mixture, exhaust gas is generated. The exhaust gas is discharged to exhaust manifolds 8R and 8L when the exhaust valves 34R and 34L are opened. Exhaust pipes 81R and 81L are connected to the exhaust manifolds 8R and 8L, respectively. Further, catalytic converters 82R and 82L are fitted to the exhaust pipes 81R and 81L, respectively. Each of the catalytic converter 82R and 82L includes a three-way catalyst and the like. When the exhaust gas passes through the catalytic converters 82R and 82L, hydrocarbon (HC), carbon monoxide (CO), and nitrogen oxide components (NOx) contained in the exhaust gas are purified. Also, downstream end portions of the exhaust pipes 81R and 81L contact each other, and connect to a muffler 83.

Figure 3:
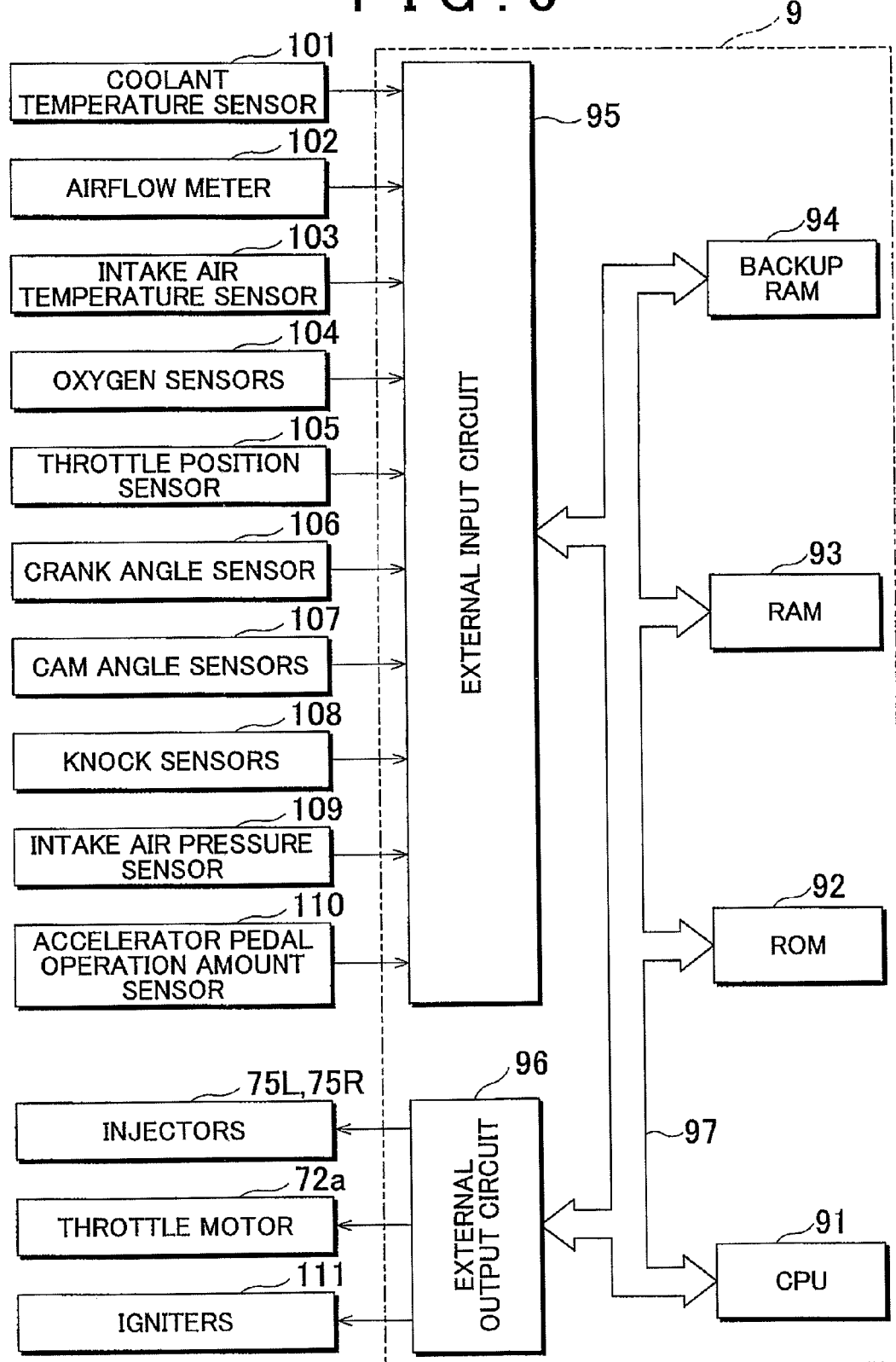
FIG. 3 is a block diagram showing the control system for the engine.

[Description of a control block] The operating state of the above-described engine E is controlled by an engine electronic control unit 9 (hereinafter, referred to as "engine ECU 9"). As shown in FIG. 3, the engine ECU 9 includes a central processing unit 91 (hereinafter, referred to as "CPU 91"), a read only memory 92 (hereinafter, referred to as "ROM 92"), a random access memory 93 hereinafter, referred to as "RAM 93"), and a backup RAM 94.

The ROM 92 stores, for example, control programs, and maps that are referred to when the control programs are executed. The CPU 91 executes computation processes based on the control programs and maps stored in the ROM 92. The RAM 93 is a memory that temporarily stores, for example, results of computations, and data input from sensors. The backup RAM 94 is a nonvolatile memory that stores, for example, data that should be reserved when the engine E is stopped. The ROM 92, the CPU 91, the RAM 93, and the backup RAM 94 are connected to each other by bus 97, and connected to an external input circuit 95 and an external output circuit 96.

The external input circuit 95 is connected to, for example, a coolant temperature sensor 101, an airflow meter 102, an intake air temperature sensor 103, oxygen sensors ($O_2$ sensors) 104, a throttle position sensor 105, a crank angle sensor 106, cam angle sensors 107, knock sensors 108, an intake air pressure sensor 109, and an accelerator pedal operation amount sensor 110. The external output circuit 96 is connected to, for example, the injectors 75R and 75L, igniters 111, and a throttle motor 72a that operates the throttle valve 72.

The coolant temperature sensor 101 detects the temperature of a coolant flowing in a water jacket 11 formed in the cylinder block 1, and transmits a signal indicating the coolant temperature to the engine ECU 9. The airflow meter 102 detects an intake air amount, and transmits a signal indicating the intake air amount to the engine ECU 9. The intake air temperature sensor 103 is disposed downstream of the air cleaner 74. The intake air temperature sensor 103 detects an intake air temperature, and transmits a signal indicating the intake air temperature to the engine ECU 9. The oxygen sensor 104 is disposed downstream of each of the catalytic converters 82R and 82L. Each oxygen sensor 104 detects an oxygen concentration in the exhaust gas, determines whether an air-fuel ratio of the exhaust gas is the stoichiometric air-fuel ratio, and transmits a signal indicating the determination to the engine ECU 9. The throttle position sensor 105 detects an opening amount of the throttle valve 72, and transmits a signal indicating the opening amount of the throttle valve 72 to the engine ECU 9.

The crank angle sensor 106 is disposed close to the crankshaft C. The crank angle sensor 106 detects a rotational angle of the crankshaft C (crank angle CA) and a rotational speed (engine rotational speed ene). More specifically, the crank angle sensor 106 outputs a pulse signal at intervals of a predetermined crank angle (for example, 30°). In an example of a technique for detecting the crank angle using the crank angle sensor 106, external teeth are formed at intervals of 30° on an outer peripheral surface of a rotor (NE rotor) 106a that is rotated integrally with the crankshaft C, and the crank angle sensor 106, which includes an electromagnetic pickup, is disposed to face the external tooth. When the crankshaft C is rotated, and the external tooth passes by the crank angle sensor 106, the crank angle sensor 106 generates an output pulse. The external teeth may be formed at intervals of 100 on the outer peripheral surface of the ME rotor 106a. In this case, the frequency of the output pulse is divided by the engine ECU 9 to generate output pulses at intervals of 30° CA.

The cam angle sensor 107 is disposed close to each of the intake camshafts 35R and 35L. For example, each cam angle sensor 107 outputs a pulse signal when the piston in a cylinder #1 is at a compression top dead center (TDC). Thus, each cam angle sensor 107 is used as a cylinder identification sensor. More specifically, each cam angle sensor 107 outputs a pulse signal each time the intake camshaft 35R or 35L is rotated one time. In an example of a technique for detecting the cam angle using each cam angle sensor 107, an external tooth is formed at one position on an outer peripheral surface of a rotor that is rotated integrally with the intake camshaft 35R or 35L, and the cam angle sensor 107, which includes an electromagnetic pickup, is disposed to face the external tooth. When the intake camshaft 35R or 35L is rotated, and the external tooth passes by the cam angle sensor 107, the cam angle sensor 107 generates an output pulse. Because the rotor is rotated at a half of the rotational speed of the crankshaft C, the cam angle sensor 107 generates an output pulse each time the crankshaft C is rotated by 720°. In other words, the cam angle sensor 107 generates an output pulse each time a given cylinder is in a given stroke (for example, each time the piston in the cylinder #1 reaches the compression top dead center).

The knock sensor 108 is disposed in each of the banks 2R and 2L. Each knock sensor 108 is a vibrating sensor that detects the vibration of the engine transmitted to the cylinder block 1, using a piezo element or an electromagnetic element (a magnet or a coil). Each knock sensor 108 transmits an output signal corresponding to the magnitude of the vibration of the cylinder block 1, to the engine ECU 9. The intake air pressure sensor 109 is fitted to the surge tank 71, and detects a pressure in the intake pipe 73 (i.e., intake pipe pressure), and transmits a signal indicating the intake air pressure to the engine ECU 9. The accelerator pedal operation amount sensor 110 outputs a detection signal corresponding to an amount of depression of an accelerator pedal (i.e., an accelerator pedal operation amount). The accelerator pedal operation amount sensor 110 determines an amount of change in the accelerator pedal operation amount per unit time, thereby determining a speed at which the accelerator pedal is operated.

The engine ECU 9 executes controls for the engine E including an ignition timing control described later, by controlling the igniters 111, the injectors 75R and 75L, the throttle motor 72a, and the like, based oil the signals output from the above-described sensors 101 to 110.

As an example of the above-described controls, the engine ECU 9 executes the ignition timing control (KCS control) that is a control of the ignition timing of the ignition plugs 77R and 77J using the igniters 111 of the engine E. In the ignition timing control, the ignition timing is adjusted based on whether knocking occurs, to suppress occurrence of knocking. Knocking is detected by the knock sensors 108. The ignition timing control for the engine E will be described in detail later. Also, the engine ECU 9 executes a control of fuel injection from the injectors 75R and 75L of the engine E. In the control of the fuel injection, a target air-fuel ratio is calculated based on an engine load, the engine rotational speed, and the like, and an amount of fuel injected from each of the injectors 75R and 75L (i.e., a period during which each of the injectors 75R and 75L is opened) is controlled so that the actual air-fuel ratio is equal to the target air-fuel ratio, based on the intake air amount detected by the airflow meter 102. Further, the engine ECU 9 executes an operation control for the throttle motor 72a for the engine E. In the operation control for the throttle motor 72a, an amount of operation of the throttle motor 72a is controlled to adjust the opening amount of the throttle valve 72 so that the actual intake air amount is equal to an intake air amount necessary for generating a required engine output, for example, based on the operation amount of the accelerator pedal operated by the driver.

[Basic control of the ignition timing control] Next, operation of the basic control of the ignition timing control according to the embodiment will be described. The ignition timing control operation for the engine E is performed by setting a final ignition timing eaop that is a control command value of the ignition timing. Hereinafter, the ignition timing is represented by an amount of crank angle [° CA], by which the ignition timing is advanced with respect to the compression top dead center in each cylinder. Hereinafter, a case where the influence of deposits is not taken into account will be described. As the engine E is used, deposits are gradually formed in the intake ports 31R and 31L, the intake valves 32R and 32L, the pistons 51R and 51L, and the like. A case where the influence of deposits formed in the engine E is taken into account will be described later.

The basic operation of the ignition timing control operation is similar to the operation described in the related art. For example, the operation similar to the operation described in Japanese Patent Application Publication No. 2002-031024 (JP-A-2002-031024) and Japanese Patent Application Publication No. 2005-147112 (JP-A-2005-147112) is performed. That is, the engine ECU 9 determines whether knocking occurs using the knock sensors 108, performs a feedback correction (feedback control) operation that adjusts the ignition timing according to the determination as to whether knocking occurs, and performs a learning control operation that stores and retains, as a learning value, the degree of change in the ignition timing caused by the feedback correction operation, to perform the feedback correction operation in quick response to the determination.

More specifically, the operation described below is performed. The operation described below is repeatedly performed at constant time intervals (for example, at intervals of 64 msec), during a period in which the ignition timing control operation is performed (i.e., during a period in which a point indicating the operating state of the engine E is in a KCS region) after the operation of the engine E is started.

First, the engine ECU 9 calculates a basic ignition timing eabse and a most retarded ignition timing eakmf, to set the final ignition timing eaop. The most retarded ignition timing eakmf is a limit value of the ignition timing when the ignition timing is retarded. Then, based on the basic ignition timing eabse and the most retarded ignition timing eakmf, the engine ECU 9 calculates a largest retarded amount eakmax that is the largest amount by which the final ignition timing eaop can be retarded with respect to the basic ignition timing eabse. For example, the basic ignition timing eabse may be set to an ignition timing at which the torque output from the engine E is maximum when the influence of knocking and the like are not taken into account (this ignition timing may be referred to as "the minimum spark advance for best torque (MBT)"). The most retarded ignition timing eakmf may be set to an ignition timing at which the level of knocking is equal to or below a permissible levels even under the worst possible condition.

In this case, the engine ECU 9 reads the engine rotational speed ene and the intake air amount ega based on signals output from the crank angle sensor 106 and the airflow meter 102, and calculates an engine load eklsm (=ega/ene). Then, the engine ECU 9 calculates the basic ignition timing eabse and the most retarded ignition timing eakmf, based on the engine rotational speed ene and the engine load eklsm. The ROM 92 of the engine ECU 9 stores map data or function data that defines a relation between the engine rotational speed ene/engine load eklsm, and the basic ignition timing eabse. The ROM 92 also stores map data or function data that defines a relation between the engine rotational speed ene/engine load eklsm, and the most retarded ignition timing eakmf. The engine ECU 9 calculates the basic ignition timing eabse and the most retarded ignition timing eakmf, by referring to the data stored in the ROM 92.

Next, the engine ECU 9 calculates the largest retarded amount eakmax, based on the basic ignition timing eabse and the most retarded ignition timing eakmf, using the equation (1) described below. The largest retarded amount eakmax is the largest amount by which the final ignition timing eaop can be retarded with respect to the basic ignition timing eabse. The largest retarded amount eakmax is set to an amount at which occurrence of knocking is reliably suppressed.

$$eak\text{max} = eabse - eakmf \tag{1}$$

Next, the engine ECU 9 determines a KCS retarded amount eaknk, thereby calculating the final ignition timing eaop. The KCS retarded amount eaknk is an amount by which the final ignition timing eaop is retarded with respect to the basic ignition timing eabse. At this time, the engine ECU 9 calculates the KCS retarded amount eaknk, based on the largest retarded amount eakmax, a KCS learning value eagknkx, and a KCS feedback correction value (K(CS feedback amount) eakcs, using the equation (2) described below.

$$eaknk = eak\text{max} - eagknkx - eakcs \tag{2}$$

Then, the engine ECU 9 sets the final ignition timing eaop by subtracting the KCS retarded amount eaknk from the basic ignition timing eabse, as shown by the equation (3) described below. That is, the final ignition timing eaop is set by obtaining a value by advancing the most retarded ignition timing eakmf by the KCS learning value eagknkx, and then retarding the value by the KCS feedback correction value eakcs, as shown by the equation (4) described below. An upper limit and a lower limit of the final ignition timing eaop are set to prevent the final ignition timing eaop from becoming equal to or above the basic ignition timing eabse, or becoming equal to or below the most retarded ignition timing eakmf.

$$eaop = eabse - eaknk \quad (3)$$

$$eaop = eakmf + eagknkx - eakcs \quad (4)$$

The KCS feedback correction value eakcs is set based on whether knocking occurs. Knocking is detected by the knock sensors 108. More specifically, when it is determined that knocking does not occur, the KCS feedback correction value eakcs is gradually decreased. For example, when the output from each knock sensor 108 is below a predetermined value, and the level of knocking is equal to or below the permissible level, the KCS feedback correction value eakcs is gradually decreased. In this case, according to the equation (4), the final ignition timing eaop is advanced. When it is determined that knocking occurs, the KCS feedback correction value eakcs is increased by a predetermined value (for example, "1.0° CA"). For example, when the output from each knock sensor 108 is equal to or above the above-described determination value, the KCS feedback correction value eakcs is increased by the predetermined value. In this case, according to the equation (4), the final ignition timing eaop is retarded.

The KCS learning value eagknkx is updated by the learning control described below. That is, when the absolute value of the KCS feedback correction value eakcs remains larger than a predetermined value (|eakcs|>X) for a predetermined time or longer, the KCS learning value eagknkx is updated to gradually decrease the absolute value of the KCS feedback correction value eakcs. That is, when the KCS feedback correction value eakcs remains larger than a given positive value (eakcs>X), a predetermined value Y is subtracted from the KCS learning value eagknkx. In addition, the predetermined value Y is subtracted from the KCS feedback correction value eakcs. When the KCS feedback correction value eakcs remains smaller than a given negative value (eakcs<−X), the predetermined value Y is added to the KCS learning value eagknkx, and the predetermined value Y is added to the KCS feedback correction value eakcs.

The backup RAM 94 of the engine ECU 9 stores the KCS learning value eagknkx that is updated by the above-described learning control. The backup RAM 94 retains the KCS learning value eagknkx also when the engine E is stopped. When the ignition timing control is started, the KCS feedback correction value eakcs is set to "0" that is an initial value. Accordingly, the final ignition timing eaop is set by advancing the most retarded ignition timing eakmf by the KCS learning value eagknkx.

In the learning control, the KCS feedback correction value eakcs may be smoothed, and the KCS learning value eagknkx may be updated based on the smoothed KCS feedback correction value eakcs. In this case, for example, a smoothing factor of one fourth may be used to smooth the KCS feedback correction value eakcs.

Figure 4:
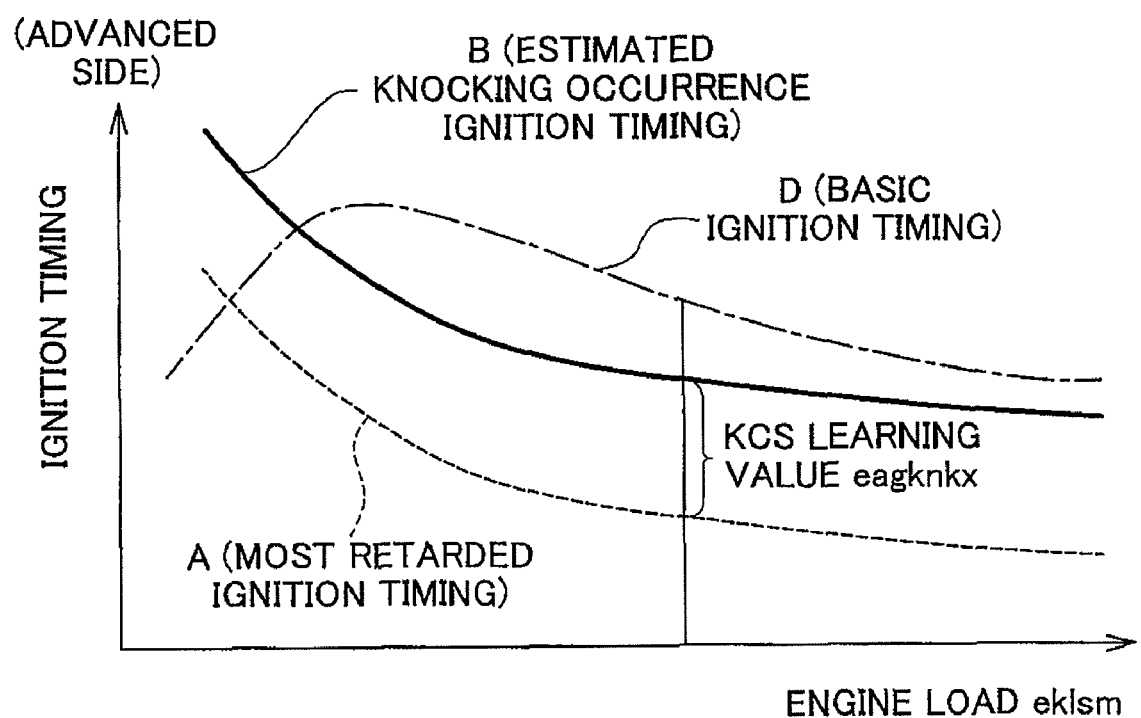
FIG. 4 is a diagram showing relations between an engine load and ignition timings.

In the embodiment, the KCS learning value eagknkx, which is learned in the above-described manner when the engine E is in a given operating state, is used in the ignition timing control executed when the engine E is in the other operating state. For example, as shown in FIG. 4 indicating the relations between the engine load and the ignition timings, when the ignition timing control is started, the line B (solid line in FIG. 4) indicating the ignition timing (estimated knocking occurrence ignition timing) is set to be parallel to the line A (dashed line in FIG. 4) for setting the most retarded ignition timing eakmf using the current KCS learning value eagknkx stored in the backup RAM 94, and ignition is performed at the ignition timing on the line B. In this case, the line B indicating the estimated knocking occurrence ignition timing is parallel to, and advanced with respect to the line A indicating the most retarded ignition timing eakmf by the KCS learning value eagknkx that is used. Then, the final ignition timing eaop is set based on the KCS feedback correction value eakcs used for the feedback correction of the ignition timing based on whether knocking occurs. As a result, the ignition timing when the engine E is in the operating state is learned, and the KCS learning value eagknkx is updated. The KCS learning value eagknkx, which is learned in the above-described manner, is used in the ignition timing control executed when the engine E is in the other operating state. The chain line D in FIG. 4 is the line for setting the basic ignition timing eabse.

By executing the above-described ignition timing control, the final ignition timing eaop is advanced to increase output torque in a range in which knocking at a level equal to or above the permissible level does not occur.

[Feature of the embodiment] The feature of the embodiment is that when it is difficult to accurately set the estimated knocking occurrence ignition timing based on the most retarded ignition timing eakmf using the KCS learning value eagknkx, the ignition timing is retarded (i.e., a timing retarding control is executed). That is, when it is not appropriate to use the KCS learning value eagknkx learned by the above-described learning control without correction, the timing retarding control is executed. Hereinafter, two cases (a first example and a second example) where it is difficult to accurately set the estimated knocking occurrence ignition timing will be described.

FIRST EXAMPLE

Figure 6:
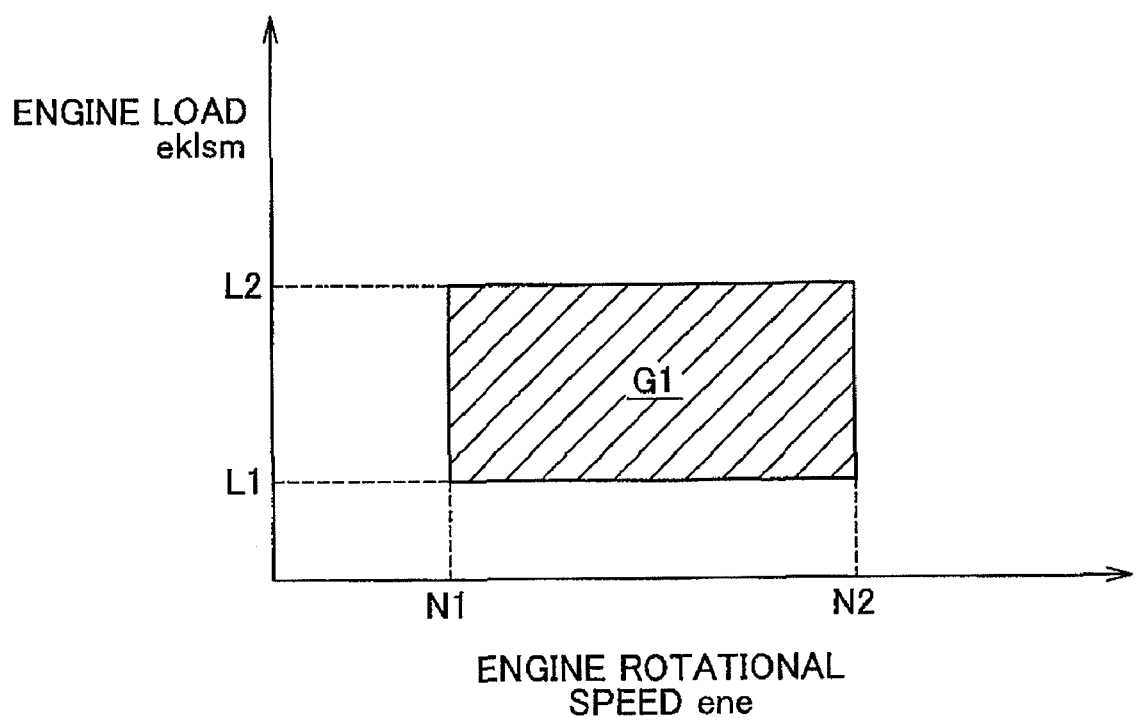
FIG. 6 is a diagram showing a low load region G1 in a first example.

In the first example, for example, when a point indicating the operating state of the engine E moves into a low load region G1 shown in FIG. 6, the timing retarding control is executed to retard the ignition timing.

The low load region G1 shown in FIG. 6 is set based on the engine rotational speed ene and the engine load eklsm. More specifically, in the low load region G1, the engine load eklsm is equal to or above L1, and below L2 (L1≦eklsm<L2), and the engine rotational speed ene is equal to or above N1 and below N2 (N1≦ene<N2). The low load region G1 shown in FIG. 6 is regarded as the region where it is difficult to accurately set the estimated knocking occurrence, ignition timing, as described in the related art. Accordingly, when the point indicating the operating state of the engine E moves into the low load region G1, the timing retarding control is executed as described below.

Figure 7:
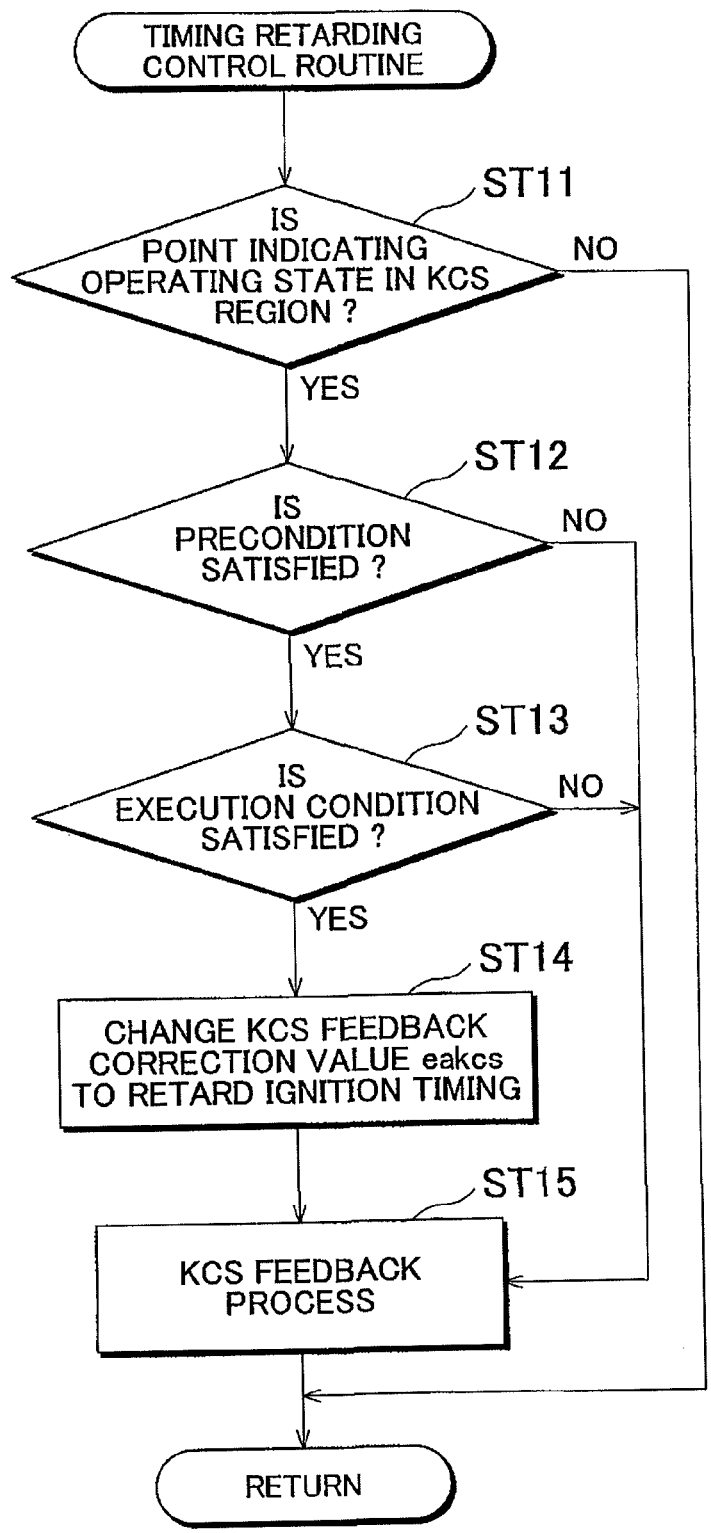
FIG. 7 is a flowchart showing the procedure of a timing retarding control in the first example.

Next, the timing retarding control in this example will be described with reference to a flowchart shown in FIG. 7. The timing retarding control routine shown in FIG. 7 is a part of a main routine relating to the ignition timing control executed by the engine ECU 9. The timing retarding control routine is repeatedly executed at constant time intervals (for example, at time intervals of 64 msec).

When the point indicating the operating state of the engine E is in the KCS region where the ignition timing control is executed, that is, during a period in which it is determined whether knocking occurs (for example, during a period other than idling time) (step ST11), it is determined whether a precondition for executing a timing retarding process is satisfied in step ST12. The precondition relates to an environment for the engine E. More specifically, the precondition includes a requirement relating to the KCS learning value eagknkx and a requirement relating to an intake air temperature etha. The KCS learning value eagknkx is required to be below a predetermined value (for example, eagknkx<15° CA). The intake air temperature etha is required to be equal to or above a predetermined temperature (etha≧40° C.).

When at least one of the requirement relating to the KCS learning value eagknkx and the requirement relating to the intake air temperature etha is satisfied, it is determined that the precondition is satisfied. When neither of the requirements is satisfied, it is determined that the precondition is not satisfied. It is determined whether the KCS learning value eagknkx is below the predetermined value by referring to the KCS learning value eagknkx stored in the backup RAM 94. It is determined whether the intake air temperature etha is equal to or above the predetermined temperature, based on the signal output from the intake air temperature sensor 103.

The requirement that the KCS learning value eagknkx is below the predetermined value is set for the following reason. When the KCS learning value eagknkx is large, the estimated knocking occurrence ignition timing set using the KCS learning value eagknkx is close to the basic ignition timing eabse. Therefore, in this case, it is possible to accurately set the estimated knocking occurrence ignition timing. Accordingly, when the KCS learning value eagknkx is small, in other words, when the estimated knocking occurrence ignition timing that is set is close to the most retarded ignition timing eakmf, the timing retarding process is executed. The requirement that the intake air temperature etha is equal to or above the predetermined temperature is set for the following reason. As the intake air temperature etha becomes higher, knocking is more likely to occur.

When the precondition is not satisfied, the routine proceeds to step ST15. In step ST15, the basic control (KCS feedback process) of the above-described ignition timing control is executed. When the precondition is satisfied, the routine proceeds to step ST13.

In step ST13, the engine ECU 9 determines whether an execution condition for executing the timing retarding process is satisfied. The execution condition relates to the operation of the engine E. More specifically, the execution condition includes a requirement relating to the engine rotational speed ene and a requirement relating to the engine load eklsm. In this case, it is determined whether the execution condition is satisfied based on whether the point indicating the engine rotational speed ene and the engine load eklsm moves into the low load region G1 shown in FIG. 6. This determination is made based on the signals output from the crank angle sensor 106 and the airflow meter 102. The engine load eklsm is calculated based on the signals output from the crank angle sensor 106 and the airflow meter 102.

When the point indicating the engine rotational speed ene and the engine load eklsm moves into the low load region G1 from the outside of the low load region G1, it is determined that the execution condition is satisfied, and the routine proceeds to step ST14. Otherwise, it is determined that the execution condition is not satisfied, and the routine proceeds to step ST15. In step ST15, the basic control (KCS feedback process) of the above-described ignition timing control is executed.

In step ST14, the engine ECU 9 executes the timing retarding process. More specifically, the engine ECU 9 changes the KCS feedback correction value eakcs by a predetermined amount to retard the ignition timing. That is, the KCS feedback correction value eakcs is increased by a predetermined value (for example, "3.0° CA"). When the KCS feedback correction value eakcs is "0" (i.e., the initial value set when the ignition timing control is started), for example, before the above-described feedback correction operation is performed, the KCS feedback correction value eakcs is set to 3.0° CA. It is preferable that the amount by which the KCS feedback correction value eakcs is changed (increased) when the point indicating the operating state of the engine E moves into the low load region G1 should be larger than the value (for example, "1.0° CA") by which the KCS feedback correction value eakcs is increased in the above-described feedback correction operation when knocking occurs.

Figure 5:
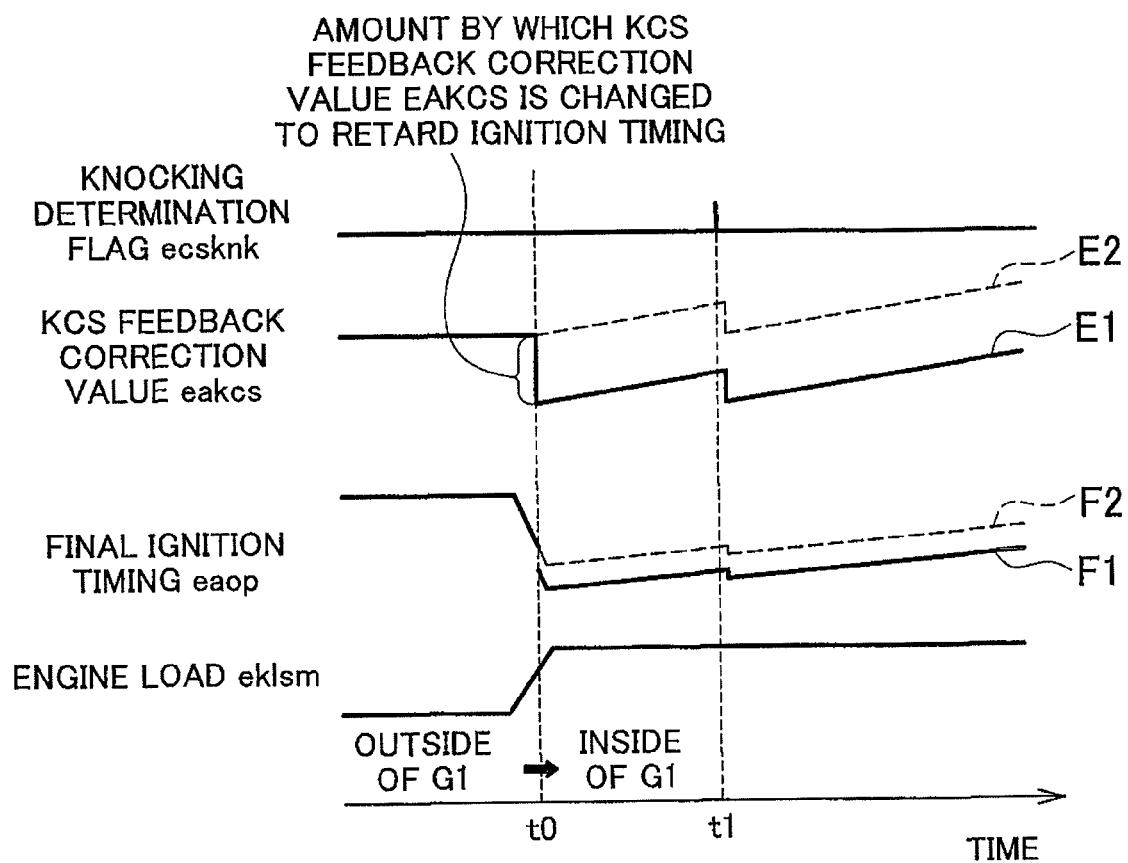
FIG. 5 is a time chart showing an example of a manner in which an ignition timing control is executed.

In step ST15, the engine ECU 9 executes the basic control (KCS feedback process) of the ignition timing control, based on the KCS feedback correction value eakcs set in the timing retarding process in step ST14. Next, an example of the manner in which the ignition timing control is executed will be described with reference to FIG. 5. In FIG. 5, the solid lines E1 and F1 indicate the KCS feedback correction value eakcs and the final ignition timing eaop, respectively when the timing retarding control is executed. The dashed lines E2 and F2 indicate the KCS feedback correction value eakcs and the final ignition timing eaop, respectively when the timing retarding control is not executed.

In FIG. 5, the ignition timing control starts to adjust the ignition timing based on whether knocking occurs, at time point t0. When the ignition timing control is started the KCS feedback correction value eakcs is set to the initial value, for example, "0". When it is determined that the point indicating the operating state of the engine E moves into the above-described low load region G1 at time point t0, the KCS feedback correction value eakcs is increased by the predetermined value (for example, "3.0° CA") as shown by the solid line E1. Accordingly, the final ignition timing eaop is set by obtaining a value by advancing the most retarded ignition timing eakmf by the KCS learning value eagknkx, and then retarding the value by the increased KCS feedback correction value eakcs, as shown by the solid line F.

Then, the above-described KCS feedback process is executed. During a period from time point t0 to time point t1, knocking at a level equal to or above the permissible level is not detected. Therefore, the KCS feedback correction value eakcs is gradually decreased from "3.0° CA" set at time point t0, as shown by the solid line E1. Therefore, after time point t0, the final ignition timing eaop is gradually advanced, as shown by the solid line F1.

When knocking at a level equal to or above the above-described determination value is detected at time point t1, that is, a knocking determination flag ecsknk is turned on, the KCS feedback correction value eakcs is increased by the predetermined value (for example, "1.0° CA"). Therefore, during a period in which knocking is detected, the final ignition timing eaop is retarded by a predetermined value. Each time knocking is detected, the KCS feedback correction value eakcs is increased by the predetermined value, and the final ignition timing eaop is retarded by the predetermined value.

When knocking is no longer detected after time point t1, the KCS feedback correction value eakcs is gradually decreased again, and accordingly the final ignition timing eaop is gradually advanced.

Thus, when the point indicating the operating state of the engine E moves into the low load region G1 where it is difficult to accurately set the estimated knocking occurrence ignition timing, the KCS feedback correction value eakcs is increased in advance, and the ignition timing (or the estimated knocking occurrence ignition timing) is retarded using the increased KCS feedback correction value eakcs. That is, when the point indicating the operating state of the engine E moves into the low load region G1, not only the KCS learning value eagknkx but also the KCS feedback correction value eakcs is used to set the final ignition timing. Thus, the final ignition timing is retarded by the amount by which the KCS feedback correction value eakcs is changed (increased). Thus, when knocking occurs, it is possible to quickly retard the final ignition timing eaop by the feedback correction process to stop knocking. Accordingly, the time required to stop knocking is short, and the frequency of occurrence of knocking is suppressed. When the correction amount, which is changed to retard the final ignition timing, is used to set the first ignition timing, first, the estimated knocking occurrence ignition timing may be set using the changed correction amount and the learning value, and then, the final ignition timing may be set using the estimated knocking occurrence ignition timing.

Also, when the point indicating the operating state of the engine E is in the low-load region G1 where it is difficult to accurately set the estimated knocking occurrence ignition timing, it is possible to suppress occurrence of unexpected knocking at a high level (i.e., extremely high-level knocking). Thus, it is possible to suppress an adverse influence on the knocking determination. For example, it is possible to reduce the possibility that when knocking actually occurs, it is erroneously determined that knocking does not occur. Because the knocking determination is accurately performed in this manner, it is possible to appropriately retard the final ignition timing eaop by the feedback correction, and to reliably stop knocking. Further, according to the embodiment, when the type of fuel or the concentration of fuel is changed, it is possible to prevent an erroneous determination as to whether knocking occurs.

In FIG. 5, when the ignition timing control is started (at time point t0), it is determined that the point indicating the operating state of the engine E moves into the above-described low load region G1. However, the point indicating the operating state of the engine E may move into the above-described low load region G1 during the ignition timing control. In this case as well, the timing retarding process in step ST14 is executed.

The timing retarding control in the example may be improved in the manners described below.

When the point indicating the operating state of the engine E repeatedly crosses the boundary of the above-described low load region G1, the timing retarding process in step ST14 is executed each time the point indicating the operating state of the engine E moves into the low load region G1. Thus, the KCS feedback correction value eakcs is increased by the predetermined amount a plurality of times. As a result, the KCS feedback correction value eakcs may become extremely large.

To avoid the situation where the KCS feedback correction value eakcs becomes extremely large, for example it is preferable that the boundary of the low load region G1 when the point indicating the operating state of the engine E moves into the low load region G1 should differ from the boundary of the low load region G1 when the point indicating the operating state moves out from the low load region G1 to produce a hysteresis effect. This avoids the situation where the point indicating the operating state of the engine E frequently moves into the low load region G1. Thus, the control is stabilized.

Also, it is preferable to correct the amount by which the KCS feedback correction value eakcs is increased in the timing retarding process, based on the history of execution of the previous timing retarding process. This avoids the situation where the KCS feedback correction value eakcs exceeds the upper limit that is set, when the point indicating the engine operating state moves into the low load region G1 a plurality of times.

When the point indicating the operating state of the engine B transiently passes through the low load region G1 due to a sudden change in the operating state of the engine E, it may be determined that the point indicating the operating state of the engine E moves into the low load region G1. However, for example, when an accelerator pedal is rapidly depressed, the timing retarding process does not need to be executed, although the engine load eklsm is sharply increased.

To avoid the situation where the timing retarding process is executed, for example, when the accelerator pedal is rapidly depressed, it is preferable to add a requirement relating to a rate of change in the engine load eklsm, to the execution condition in step ST13. In this case, the rate of change in the engine load eklsm is required to be below a predetermined value. Thus, when the point indicating the engine rotational speed ene and the engine load eklsm moves into the low load region G1 shown in FIG. 6, and the rate of change in the engine load eklsm is below the predetermined value, it is determined that the execution condition is satisfied. This avoids the situation where the timing retarding process is executed when the rate of change in the engine load eklsm is equal to or above the predetermined value, for example, when the point indicating the operating state of the engine E transiently passes through the low load region G1.

Also, in this example, the KCS learning value eagknkx is updated based on the change in the KCS feedback correction value eakcs by the above-described learning control. However, in the case where the amount, by which the KCS feedback correction value eakcs is increased when the point indicating the operating state of the engine E moves into the low load region G1, is larger than the amount by which the KCS feedback correction value eakcs is increased when knocking occurs, the KCS learning value eagknkx that is excessively decreased may be erroneously learned.

Therefore, when the KCS learning value eagknkx is updated using the smoothed KCS feedback correction value eakcs, it is preferable that the smoothing factor used to smooth the KCS feedback correction value eakcs should be set to a small value during the timing retarding process. For example, when the smoothing factor of one fourth is normally used, it is preferable to use the smoothing factor of one eighth during the timing retarding process. Thus, when the KCS feedback correction value eakcs is increased in the timing retarding process, it is possible to reduce the possibility that the KCS learning value eagknkx that is excessively decreased may be erroneously learned.

SECOND EXAMPLE

Figure 8:
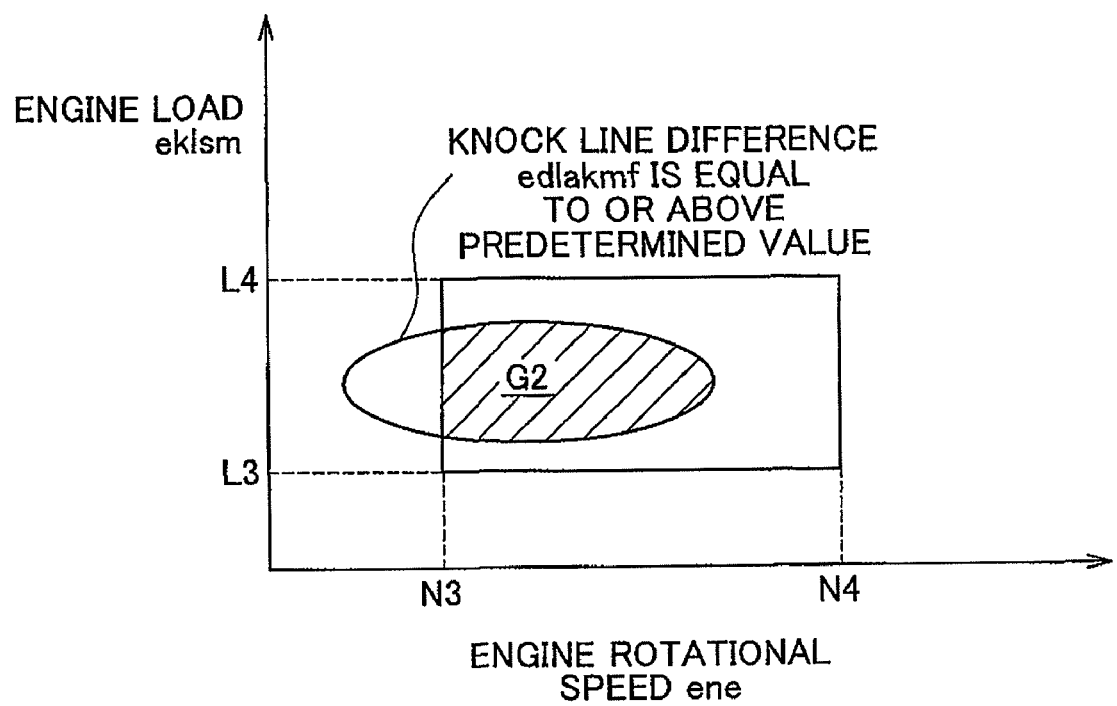
FIG. 8 is a diagram showing a low load region G2 in a second example.

In the second example, for example when the point indicating the operating state of the engine E moves into a low load region G2 shown in FIG. 8, a timing retarding control is executed to retard the ignition timing. The second example differs from the first example in that the degree of the influence of formation of deposits in the engine E is taken into account. Accordingly, the execution condition for executing the timing retarding process in the second example differs from the execution condition in the first example. Hereinafter, the difference between the first example and the second example will be mainly described, and the same and corresponding parameters and values as in the first example will be denoted by the same reference characters, and the detailed description thereof will be omitted.

First, a ratio learning operation, which is performed taking into account the degree of the influence of formation of deposits in the engine E, will be described. That is, in the ignition timing control, a ratio learning value eragknkx is updated based on whether knocking occurs. The ratio learning value eragknkx is set as an index value indicating the degree of formation of deposits in the engine E. When the ratio learning value eragknkx is "0", the ratio learning value eragknkx indicates that no deposit is formed in the engine E. When the ratio learning value eragknkx is "1", the ratio learning value eragknkx indicates that the amount of deposits formed in the engine E is the maximum possible amount. Thus, the ratio learning value eragknkx indicates the degree of formation of deposits in the engine E.

The ratio learning value eragknkx is set to "0" that is the initial value, when no deposit is formed in the engine E at the time of factory shipment. Then, the ratio learning value eragknkx is gradually changed in the range of 0 to 1, according to the frequency of occurrence of knocking detected by the knock sensors 108. More specifically, when the frequency of occurrence of knocking increases, the ratio learning value eragknkx is gradually increased. When the frequency of occurrence of knocking decreases, the ratio learning value eragknkx is gradually decreased. The backup RAM 94 of the engine ECU 9 stores the updated ratio learning value eragknkx as well as the above-described KCS learning value eagknkx, and retains the updated ratio learning value eragknkx also when the engine E is stopped.

When the degree of formation of deposits in the engine E, that is, the ratio learning value eragknkx is increased, knocking is more likely to occur. Therefore, in the second example, the most retarded ignition timing is further retarded based on the ratio learning value eragknkx. In the above-described first example, various ignition timings are calculated using the most retarded ignition timing eakmf. In the second example, instead of the most retarded ignition timing eakmf, a most retarded ignition timing eakmfx calculated based on the ratio learning value eragknkx is used.

When the ignition timing control operation is performed after the operation of the engine E is started, the engine ECU 9 calculates the basic ignition timing eabse, and calculates the most retarded ignition timing eakmfx based on the ratio learning value eragknkx, to set the final ignition timing. When the ratio learning value eragknkx is a given value, the most retarded ignition timing eakmfx is calculated in the manner described below.

Figure 10:
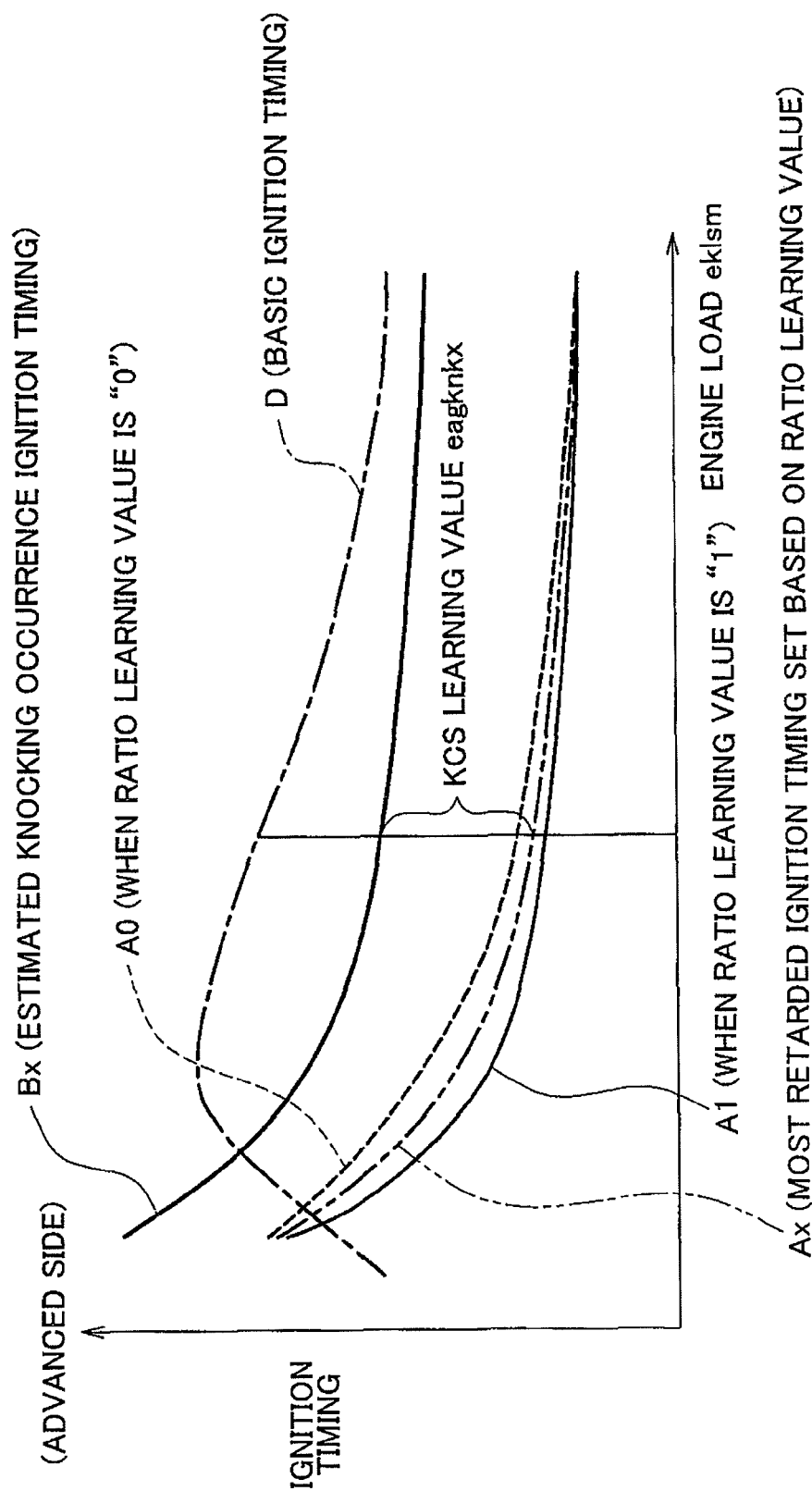
FIG. 10 is a diagram showing relations between the engine load and ignition timings in the second example.

When the ratio learning value eragknkx is "0", the most retarded ignition timing eakmf in the first example is used as the most retarded ignition timing eakmfx. With regard to the most retarded ignition timing eakmf used when the ratio learning value eragknkx is "0", the ROM 92 of the engine ECU) 9 stores map data or function data that defines a relation between the engine rotational speed ene/the engine load eklsm, and the most retarded ignition timing eakmf. In FIG. 10 indicating relations between the engine load and the ignition timings, the dashed line is the line A0 for setting the most retarded ignition timing eakmf when the ratio learning value eragknkx is "1".

When the ratio learning value eragknkx is "1", a most retarded ignition timing eakmf' which is more retarded than the most retarded ignition timing eakmf in the first example, is used as the most retarded ignition timing eakmfx. With regard to the most retarded ignition timing eakmf' used when the ratio learning value eragknkx is "1", the ROM 92 of the engine ECU 9 stores map data or function data that defines a relation between the engine rotational speed ene/the engine load eklsm, and the most retarded ignition timing eakmf'. In FIG. 10 indicating the relations between the engine load and the ignition timings, the thin solid line is the line A1 for setting the most retarded ignition timing eakmf' used when the ratio learning value eragknkx is "1".

The most retarded ignition timing eakmfx used when the ratio learning value eragknkx is a given value is calculated using the equation (5) described below.

$$eakmfx=(1-eragknkx)*eakmf+eragknkx*eakmf' \qquad (5)$$

According to the equation (5), as the ratio leaning value eragknkx approaches "0", the most retarded ignition timing eakmfx approaches the most retarded ignition timing eakmf used when the ratio learning value eragknkx is "0". As the ratio learning value eragknkx approaches "1", the most retarded ignition timing eakmfx approaches the most retarded ignition timing eakmf used when the ratio learning value eragknkx is "1". In FIG. 10 indicating the relations between the engine load and the ignition timings, the two-dot chain line is the line Ax for setting the most retarded ignition timing eakmfx used when the ratio learning value eragknkx is a given value.

Then, the final ignition timing eaop, the largest retarded amount eakmax, the KCS learning value eagknkx, the KCS feedback correction value eakcs, the KCS retarded amount eaknk, and the like are calculated using the most retarded ignition timing eakmfx calculated based on the equation (5), instead of the most retarded ignition timing eakmf, in the equations (1) to (4) in the first example.

Further, the KCS learning value eagknkx, which is learned by the learning control when the engine E is in a given operating state, is used in the ignition timing control executed when the engine E is in the other operating state. For example, as shown in FIG. 10 indicating the relations between the engine load and the ignition timings, when the ignition timing control is started, the line Bx (thick solid line in FIG. 10) indicating the ignition timing (estimated knocking occurrence ignition timing) is set to be parallel to the line Ax (two-dot chain line in FIG. 10) for setting the most retarded ignition timing eakmfx, using the current KCS learning value eagknkx stored in the backup RAM 94, and ignition is performed at the ignition timing on the line Bx. In this case, the line Bx indicating the estimated knocking occurrence ignition timing is parallel to, and advanced with respect to the line Ax indicating the most retarded ignition timing eakmfx by the KCS learning value eagknkx that is used. Then, the final ignition timing eaop is set based on the KCS feedback correction value eakcs used for the feedback correction of the ignition timing based on whether knocking occurs. As a result, the ignition timing when the engine E is in the operating state is learned, and the KCS learning value eagknkx is updated. The KCS learning value eagknkx, which is learned in the above-described manner, is used in the ignition timing control executed when the engine B is in the other operating state. The chain line D in FIG. 10 is the line for setting the basic ignition timing eabse.

In the second example, for example, when the point indicating the operating state of the engine E moves into the low load region G2 shown in FIG. 8, the timing retarding control is executed to retard the ignition timing.

The low load region G2 shown in FIG. 8 is set based on the engine rotational speed ene, the engine load eklsm, and a knock line difference edlakmf. More specifically, in the low load region G2, the engine load eklsm is equal to or above L3, and below L4 (L3≦eklsm<L4), and the engine rotational speed ene is equal to or above N3 and below N4 (N3≦ene<N4). Also, in the low load region G2, the knock line difference edlakmf is equal to or above a predetermined value (for example, edlakmf≧3.0° CA). The knock line difference is an amount indicating a difference (angular difference) between the most retarded ignition timing eakmf used when the ratio learning value eragknkx is "0" and the most retarded ignition timing eakmf' used when the ratio learning value eragknkx is "1", in the case where the engine rotational speed ene is a given value, and the engine load eklsm is a given value. As well as the low load region G1 in the first example, the low load region G2 shown in FIG. 8 is regarded as the region where it is difficult to accurately set the estimated knocking occurrence ignition timing, as described in the related art. Accordingly, when the point indicating the operating state of the engine E moves into the low load region G2, the timing retarding control is executed as described below.

Figure 9:
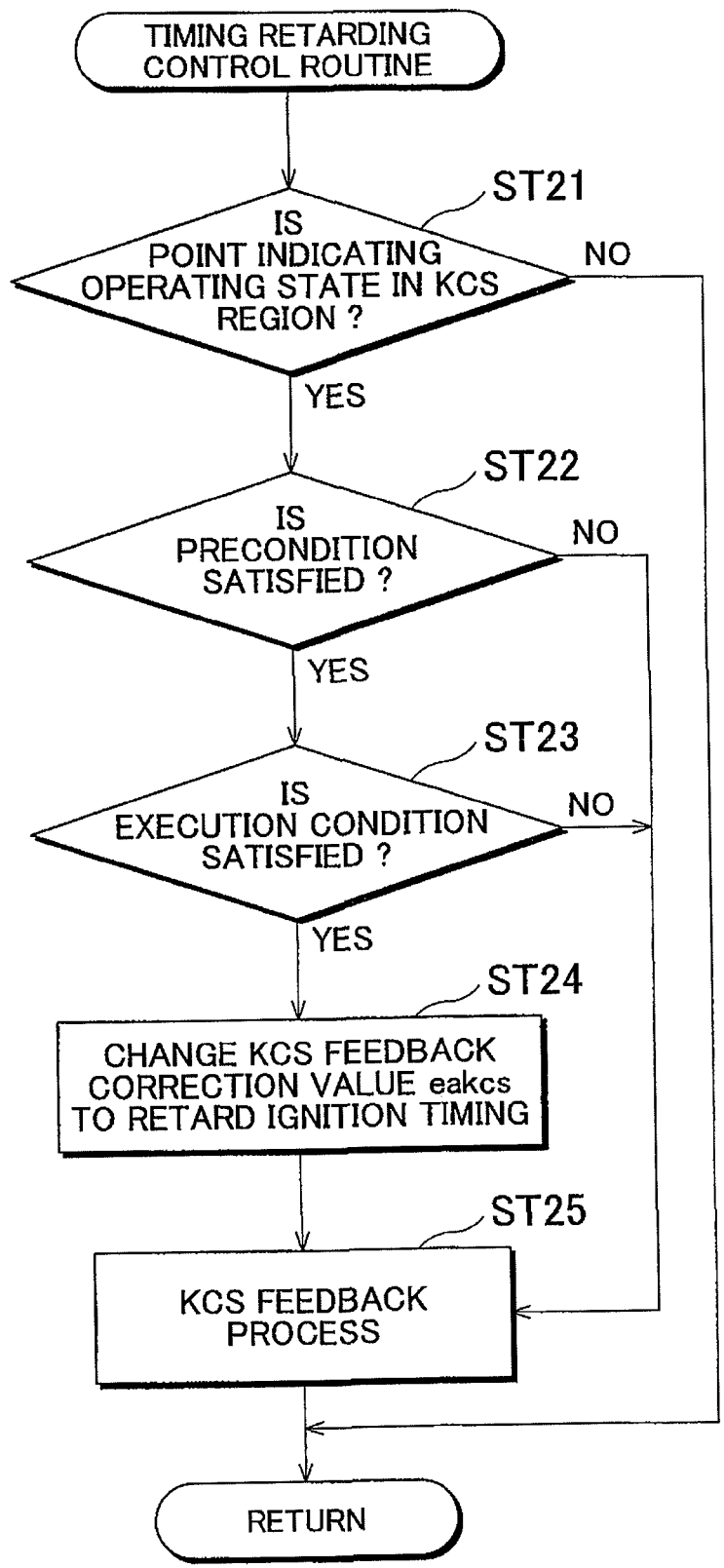
FIG. 9 is a flowchart showing the procedure of a timing retarding control in the second example.

Next, the timing retarding control in the second example will be described with reference to a flowchart shown in FIG. 9. The timing retarding control routine shown in FIG. 9 is a part of a main routine relating to the ignition timing control executed by the engine ECU 9. The timing retarding control routine is repeatedly executed at constant time intervals (for example, at time intervals of 64 msec).

The routine is substantially the same as the routine in the first example shown in FIG. 7. A precondition in step ST22 slightly differs from the precondition in step ST12, and an execution condition in step ST23 slightly differs from the execution condition in step ST13. Processes in steps ST21, ST24, and ST25 are the same as the processes in steps ST11, ST14, and ST 15.

In step ST22, the engine ECU 9 determines whether the precondition for executing the timing retarding process is satisfied. The precondition relates to an environment for the engine E. More specifically, the precondition includes a requirement relating to the KCS learning value eagknkx, a requirement relating to an intake air temperature etha, and a requirement relating to the ratio learning value eragknkx. The KCS learning value eagknkx is required to be below a predetermined value (for example, eagknkx<15° CA). The intake air temperature etha is required to be equal to or above a predetermined temperature (etha≧40° C.). The ratio learning value eragknkx is required to be equal to or above a predetermined value (for example, eragknkx≧0.2).

When at least one of the requirement relating to tie KCS teaming value eagknkx, the requirement relating to the intake air temperature etha, and the requirement relating to the ratio learning value eragknkx is satisfied, it is determined that the precondition is satisfied. When none of the requirements is satisfied, it is determined that the precondition is not satisfied. It is determined whether the ratio learning value eragknkx is equal to or above the predetermined value, by referring to the ratio learning value eragknkx stored in the backup RAM 94. The requirement that the ratio learning value eragknkx is equal to or above the predetermined value is set for the following reason. When the ratio learning value eragknkx is increased, the degree of formation of deposits in the engine E is increased. In this case, knocking is more likely to occur.

When the precondition is not satisfied the routine proceeds to step ST25. In step ST25, the above-described basic control (KCS feedback process) of the ignition timing control is executed. When the precondition is satisfied, the routine proceeds to step ST23.

In step ST23, the engine ECU 9 determines whether the execution condition for executing the timing retarding process is satisfied. The execution condition relates to the operation of the engine E. More specifically, the execution condition includes a requirement relating to the engine rotational speed ene, a requirement relating to the engine load eklsm, and a requirement relating to the knock line difference edlakmf. In this case it is determined whether the execution condition is satisfied, based on whether the point indicating the engine rotational speed ene, the engine load eklsm, and the knock line difference edlakmf moves into the low load region G2 shown in FIG. 8.

When the point indicating the engine rotational speed ene, the engine load eklsm, and the knock line difference edlakmf moves into the low load region G2 from the outside of the low load region G2, it is determined that the execution condition is satisfied, and the routine proceeds to step ST24. In step ST24, the timing retarding process is executed. Otherwise, it is determined that the execution condition is not satisfied, and the routine proceeds to step ST25. In step ST25, the basic control (KCS feedback process) of the ignition timing control is executed.

In the second example as well, when the point indicating the operating state of the engine E moves into the low load region G2 where it is difficult to accurately set the estimated knocking occurrence ignition timing, the same timing retarding process as that in the first example is executed. Therefore, it is possible to obtain the same advantageous effects as those obtained in the first example. Although the timing retarding control in the second example may be improved in the same manners as in the first example, the description of the improvements of the timing retarding control in the second example is omitted.

What is claimed is:

1. An ignition timing control apparatus for an internal combustion engine, comprising:
    a learning portion that sets a learning value of an ignition timing when the internal combustion engine is in a given operating state, by executing a learning control, wherein the learning value is used in an ignition timing control executed when the internal combustion engine is in another operating state;
    an estimated knocking occurrence ignition timing setting portion that sets an estimated knocking occurrence ignition timing based on a most retarded ignition timing using the learning value, wherein the most retarded ignition timing is set based on an operating state of the internal combustion engine; and
    a final ignition timing setting portion that sets a final ignition timing, by executing a feedback correction process in which a correction amount is based on whether knocking occurs when ignition is performed at the estimated knocking occurrence ignition timing,
    wherein when a point indicating the operating state of the internal combustion engine moves into a region where it is difficult to set the estimated knocking occurrence ignition timing, the final ignition timing setting portion changes the correction amount by a predetermined amount, to a changed correction amount, so as to retard the final ignition timing, and sets the final ignition timing using the learning value and the changed correction amount, and
    wherein the region where it is difficult to set the estimated knocking occurrence ignition timing is a low load region in which an engine load is low.

2. The apparatus according to claim 1, wherein
    the final ignition timing setting portion sets the final ignition timing, by subtracting the changed correction amount from a value obtained by adding the learning value to the most retarded ignition timing.

3. The apparatus according to claim 1, wherein
    when at least one of a requirement that the learning value is below a predetermined value, and a requirement that an intake air temperature is equal to or above a predetermined temperature is satisfied, the final ignition timing setting portion sets the final ignition timing using the learning value and the changed correction amount.

4. The apparatus according to claim 1, wherein the region where it is difficult to set the estimated knocking occurrence ignition timing is a low load region in which an engine load is low.

5. The apparatus according to claim 4, wherein
the final ignition timing setting portion includes a determination portion that determines that the point indicating the operating state of the internal combustion engine is in the low load region, when the engine load is equal to or above a first predetermined value and below a second predetermined value, and an engine rotational speed is equal to or above a third predetermined value and below a fourth predetermined value.

6. The apparatus according to claim 1, wherein:
the region where it is difficult to set the estimated knocking occurrence ignition timing is an overlapping region where a low load region where an engine load is low overlaps a region where a difference in the most retarded ignition timing is equal to or above a predetermined value; and
the difference in the most retarded ignition timing is a difference between the most retarded ignition timing when no deposit is formed in the internal combustion engine and the most retarded ignition timing when an amount of a deposit formed in the internal combustion engine is a maximum possible amount.

7. The apparatus according to claim 1, wherein
the predetermined amount, by which the correction amount is changed to retard the final ignition timing when the point indicating the operating state of the internal combustion engine moves into the region where it is difficult to set the estimated knocking occurrence ignition timing, is set to be larger than an amount by which the correction amount is changed to retard the final ignition timing when knocking occurs.

8. The apparatus according to claim 1, wherein:
when the point indicating the operating state of the internal combustion engine moves into the region where it is difficult to set the estimated knocking occurrence ignition timing, the final ignition timing setting portion changes the correction amount by the predetermined amount to retard the final ignition timing, and sets the final ignition timing using the estimated knocking occurrence ignition timing set using the learning value and the changed correction amount.

9. An ignition timing control method for an internal combustion engine, comprising:
setting an estimated knocking occurrence ignition timing based on a most retarded ignition timing using a learning value of an ignition timing learned by a learning control when the internal combustion engine is in a given operating state, wherein the most retarded ignition timing is set based on an operating state of the internal combustion engine;
setting a final ignition timing by executing a feedback correction process in which a correction amount is based on whether knocking occurs when ignition is performed at the estimated knocking occurrence ignition timing; and
determining whether a point indicating the operating state of the internal combustion engine moves into a region where it is difficult to set the estimated knocking occurrence ignition timing;
wherein when it is determined that the point indicating the operating state of the internal combustion engine moves into the region where it is difficult to set the estimated knocking occurrence ignition timing, the correction amount is changed by a predetermined amount, to a changed correction amount, so as to retard the final ignition timing, and the final ignition timing is set using the learning value and the changed correction amount, and
wherein the region where it is difficult to set the estimated knocking occurrence ignition timing is a low load region in which an engine load is low.

* * * * *